United States Patent [19]

Adams, Jr. et al.

[11] 4,333,718
[45] Jun. 8, 1982

[54] PHOTOGRAPHIC FLASH CONTROL CIRCUITRY HAVING SELECTIVELY OPERABLE INTERNAL SENSOR

[75] Inventors: James R. Adams, Jr., Littleton; Francis T. Ogawa, Lakewood, both of Colo.

[73] Assignee: Rollei of America, Inc., Littleton, Colo.

[21] Appl. No.: 112,605

[22] Filed: Jan. 16, 1980

[51] Int. Cl.³ .............................................. G03B 15/05
[52] U.S. Cl. ...................................... 354/31; 354/33; 354/34
[58] Field of Search .................... 354/33, 34, 145, 31, 354/23 D; 315/151, 241 P

[56] References Cited

U.S. PATENT DOCUMENTS

| | | |
|---|---|---|
| 3,601,022 | 8/1971 | Languau .............................. 354/34 |
| 3,737,721 | 6/1973 | Ogawa .............................. 354/33 X |
| 3,774,072 | 11/1973 | Ogawa .............................. 315/151 |
| 4,249,109 | 2/1981 | Ogawa .............................. 354/33 X |

*Primary Examiner*—Michael L. Gellner
*Attorney, Agent, or Firm*—Allegretti, Newitt, Witcoff & McAndrews

[57] ABSTRACT

An external light integrating circuitry connectable over two-wires to a flash control circuitry, for causing automatic disabling of an internal light integrating circuitry connected within the control circuitry. The external integrating circuitry receives power over the two wires and transmits light integrating information back to flash termination circuitry within the control circuitry. Camera shutter contacts are connectable with the external integrating circuitry for transmitting a flash initiating signal via the two wires for initiating the photographic flash.

13 Claims, 3 Drawing Figures

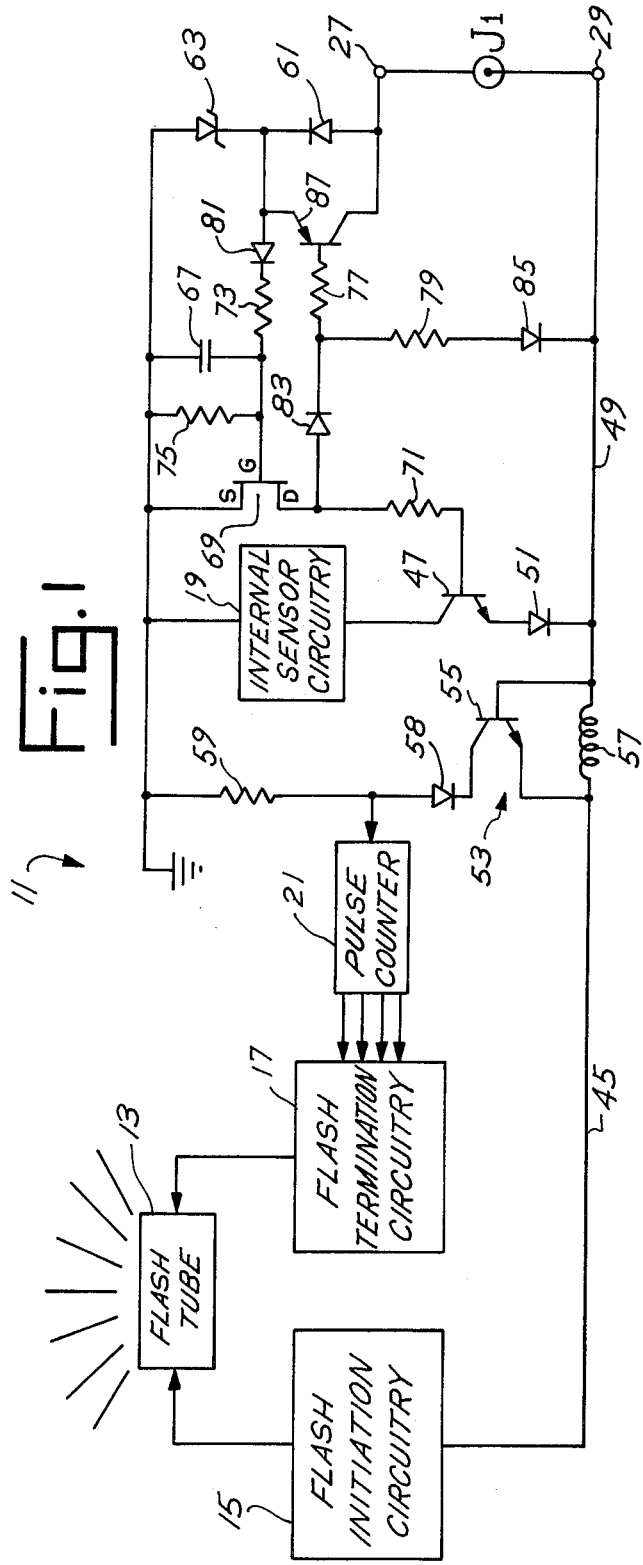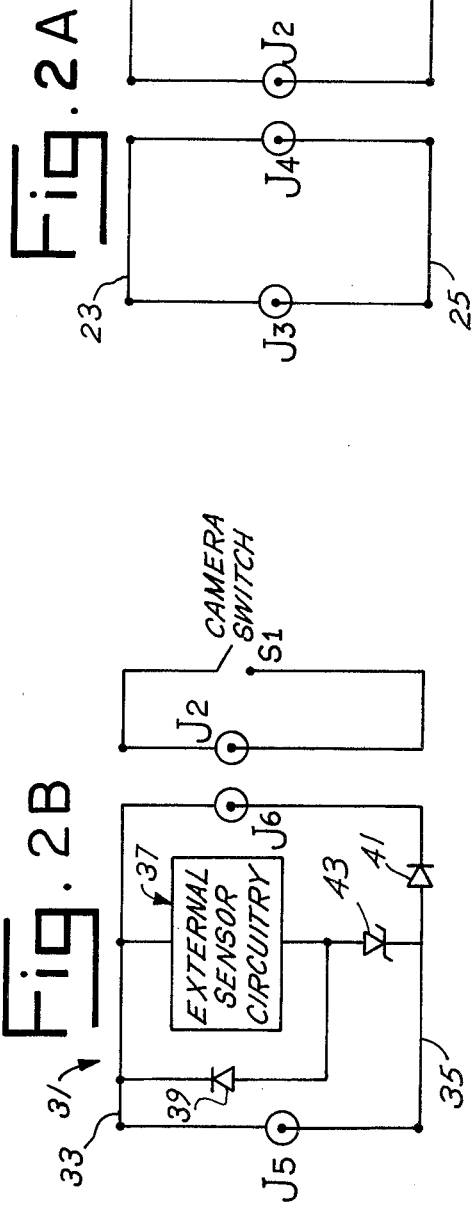

PHOTOGRAPHIC FLASH CONTROL CIRCUITRY HAVING SELECTIVELY OPERABLE INTERNAL SENSOR

BACKGROUND OF THE INVENTION

The present invention relates generally to light controlling systems and more particularly to an improved sensing system for use with a photographic flash device.

Electronic photographic flash systems are known in the art in which a flash of light produced by the flash tube of the system is automatically terminated by a light responsive sensing device after a predetermined total quantity of light has been received from the scene being photographed.

In the prior art photographic systems, a light sensing device is generally mounted on or formed as a part of the flash device which in turn is connected to a camera via a standard two conductor connection therebetween. However, distinct advantages may be obtained by a photographer when the light sensing device of the flash system is used as an independent member of the system, detached from both the camera and the flash device, as shown in U.S. Pat. No. 3,774,072 issued to Francis T. Ogawa, on Nov. 20, 1973.

However, it would be beneficial to provide both a light sensing device secured within the flash device and a light sensing device capable of being remotely located from the camera. With the provision of two sensors which are selectively operable by the photographer, the photographer obtains the capability of using either sensor as he desires to produce photographs.

With such a two sensor system, however, the fixed sensing device must be deactuated when using the remotely positionable sensing device. It would be beneficial, also, if the external sensing device would require only a two-wire standard connection for communication with the flash.

It is, therefore, an object of the present invention to provide an improved photographic flash system.

It is also an object of the present invention to provide a flash system having a fixed and a non-fixed sensor, selectively operable by the photographer.

It is a further object of the invention to provide an external sensor connectable by two wires to a flash control circuitry having an internal sensor. The connection of the external sensor automatically disables the internal sensor's control of flash duration.

SUMMARY OF THE INVENTION

These and other objects of the invention are accomplished in an external sensor circuitry which is connectable to flash control circuitry for disabling of the control circuitry's internal sensor. The external sensor circuitry is powered by the flash circuitry and communicates with the control circuitry's flash termination circuitry for effecting flash termination.

The preferred embodiment utilizes a two-wire cable interposing the control circuitry and the external sensor. A second two wire cable interposes the camera and the external sensor for communicating shutter actuation of the camera to the control circuitry for initiating the photographic flash.

BRIEF DESCRIPTION OF THE DRAWINGS

FIG. 1 is a partial block and partial electrical schematic diagram of a preferred embodiment of the flash control circuitry of the present invention.

FIG. 2A is a schematic diagram of a two-wire connector system for use with the flash control circuitry of FIG. 1.

FIG. 2B is a schematic diagram of a two-wire connector system having an external sensor circuitry, for use with the flash circuitry of FIG. 1.

DESCRIPTION OF THE PREFERRED EMBODIMENT

Referring to FIG. 1, a flash circuitry 11, for use in a photographic flash device, controls initiation and termination of a photographic flash from a flash tube 13 for producing a camera flash to the scene being photographed. The duration of the flash is controlled in accordance with the quantity of light reflected back from the scene to the flash device. A flash initiation circuitry 15 controls initiation of the flash from tube 13, and a flash termination circuitry 17 terminates the flash for controlling flash duration.

An internal sensor circuitry 19 is positioned within the housing of the flash device for monitoring reflected light from the scene. Sensor circuitry 19 is interconnected within circuitry 11 for generating a plurality of pulse signals each of which is indicative of a predetermined quantity of light. The pulses are counted via a pulse counter 21 for generating a count output signal to flash termination circuitry 17. Termination circuitry 17 terminates the flash of tube 13 responsive to a particular count signal generated at the output of pulse counter 21.

Flash circuitry 11 includes a two-wire connector J1 which is plug-compatible with another two-wire connector, for connecting flash circuitry 11 with a camera shutter switch housed in the particular camera being utilized. Referring to FIG. 2A, a camera switch S1 and an electrically interconnected two-wire connector J2 are housed in the camera. A pair of wires 23, 25 interpose a second pair of two-wire connectors J3, J4, which are plug-compatible with respective connectors J1 (FIG. 1) and J2 (FIG. 2A). In this fashion, wires 23, 25 serve to interconnect the camera switch S1 of the particular camera being used with the flash circuitry 11 of the flash device being used.

Camera switch S1 effectively communicates with flash circuitry 11 via wires 23, 25, indicating the open or closed condition of switch S1. When the camera switch is closed responsive to the photographer taking a picture, a pair of terminals 27, 29 of circuitry 11 are electrically shorted for initiating a flash from tube 13.

Referring to FIG. 2A, camera switch S1 and its associated two-wire connector J2 are illustrated in conjunction with an external sensing circuitry 31. Sensing circuitry 31 includes a pair of two-wire connectors J5, J6 which are plug-compatible with respective connectors J1 (FIG. 1) and J2 (FIG. 2A). Sensing circuitry 31 includes a pair of conducting wires 33, 35, an external sensor circuitry 37, diodes 39, 41, and a zener diode 43, connected as shown. External sensor circuitry 37 is neither fixed within the housing of the flash device nor fixed within the camera being used, to permit the external sensor circuitry to be positioned according to the photographer's needs without being restricted to the position of the camera or the flash device. As will suggest itself, wires 33, 35 may be as long as desired in order to permit freedom of positioning of external sensor circuitry 37.

A feature of the present embodiment permits interconnection of the two-wire connectors J1 and J5 for electrically interconnecting external sensor circuitry 37 with flash circuitry 11. Sensing circuitry 31 is designed to permit communication of camera switch S1 with flash circuitry 11 in the same manner as described with respect to FIG. 2A, such that camera switch S1 when actuated will initiate the flash of tube 13. The coupling of external sensing circuitry 31 into flash circuitry 11 automatically causes deactivation of internal sensor circuitry 19 such that only external sensor circuitry 37 is permitted to sense light for controlling the duration of the flash. The circuitry also permits a pulse output developed by external sensor circuitry 37 to be counted by pulse counter 21.

Thus, the circuitry of the embodiment utilizes the same two terminals 27, 29 which normally trigger flash tube 13, for extinguishing operation of internal sensor circuitry 19 and permitting communication of an indication of the quantity of light sensed by external sensor 37 to pulse counter 21.

Referring to FIG. 1, flash initiation circuitry 15 controls the initiation of flash tube 13 responsive to a voltage level appearing along a drive conductor 45. Such flash initiation circuitry may conform with circuitry illustrated in pending U.S. patent application Ser. No. 999, filed under the name of Francis T. Ogawa, on Jan. 4, 1979, which application is incorporated herein by reference. The voltage level along drive conductor 45 is controlled by camera switch S1 for initiating the flash.

Internal sensor circuitry 19, monitors light from the scene being photographed for producing an output to the collector of a transistor 47 for feeding current pulses onto a drive conductor 49 via a diode 51. The current pulses developed along conductor 49 feed a current-to-voltage pulse converter 53 formed from a transistor 55, an inductor 57, a diode 58 and a resistor 59, connected as shown. Converter 53 converts the current pulses developed along drive conductor 49 into voltage pulses which are fed to pulse counter 21.

Conductors 45, 49 are initially powered positive with respect to ground. Connection of the circuitry of FIG. 2A to flash circuitry 11, results in no current flow between terminals 27, 29 when switch S1 is open. The closing of switch S1 shorts terminals 27, 29, constructing a current path from conductor 49 through the anode-cathode junction of a diode 61 and the cathode-anode junction of a zener diode 63 to ground. The shorting of terminals 27, 29 causes a drop in the positive voltage on conductor 49 to a voltage regulated by zener diode 63. Flash initiation circuitry senses the voltage drop on conductor 49 and responsively initiates actuation of flash tube 11, causing conductors 45, 49 to be driven negative with respect to ground. Reference is made to the above-cited Ogawa patent application for method and apparatus for driving the conductor negative upon initiation of the flash tube in response to camera switch actuation.

With drive conductor 49 negative with respect to ground, current pulses developed by internal sensor circuitry 19 follow an output path through the collector-emitter path of transistor 47 and through diode 51 onto conductor 49. Current-to-voltage converter 53 senses the current pulses on conductor 49 and generates voltage pulses to counter 21 for terminating the flash of tube 13. Diode 58 serve to block current through transistor 55 when drive conductors 45, 49 are positive.

Transistor 47 serves as a control switch for passing current pulses from internal sensor circuitry 19 to conductor 49. Transistor 47 is placed in an ON condition for passing pulses or an OFF condition for blocking pulses in accordance with a control current fed to the base of transistor 47.

A circuitry 65 monitors whether the circuitry of FIG. 2A or FIG. 2B is connected across terminals 27, 29 and generates the control current to transistor 47 accordingly. Circuitry 65 includes a capacitor 67, a field-effect transistor (FET) 69, resistors 71, 73, 75, 77, 79, diodes 81, 83, 85 and transistor 87, connected as shown.

Capacitor 67 controls FET 69 for generating the control current to transistor 47. When capacitor 67 is uncharged, FET 69 is biased at zero volts, gate to source, turning FET 69 ON and allowing current to flow from the source to the drain of the FET. The drain of FET 69 is connected to the base of transistor 47 via a resistor 71 for feeding current to transistor 47 turning ON the same.

When capacitor 67 is charged, however, the gate to source junction of FET 69 is reversed biased turning FET 69 OFF. No drain current flows and transistor 47 is turned OFF.

With the circuitry of FIG. 2A connected across terminals 27, 29 and with switch S1 open, no current flows between terminals 27, 29 and capacitor 67 remains uncharged. When camera switch S1 of FIG. 2A is actuated, a voltage drop is developed across zener diode 63, changing the voltage level appearing on conductor 49. The flash initiation circuitry senses the drop in voltage on conductor 49 and actuates the flash tube causing conductor 49 to be driven negative. The voltage appearing across zener diode 63 is removed so quickly by conductor 49 going negative that the time constant of resistor 73 and capacitor 67 causes capacitor 67 to effectively ignore the momentary appearance of voltage on zener diode 63. Capacitor 67 remains uncharged and internal sensor circuitry 19 is permitted to pass current pulses to conductor 49.

Diode 61 blocks any current flowing between terminals 27, 29 when conductor 49 goes negative. Such current blocking by diode 61 prevents the circuitry of FIG. 2A from shorting drive conductor 49 to a low negative voltage when the conductor is driven negative.

When external sensing circuitry 31 of FIG. 2B is connected to the flash circuitry, conductor 49 still maintains a positive voltage prior to flash. Current, however, flows between terminals 27, 29 via zener diode 43, diode 39, diode 61 and zener diode 63, despite switch S1 being open. A voltage drop, therefore, will appear across zener diode 63, which voltage drop is coupled through diode 81 and resistor 73 to charge capacitor 67 to a voltage determined by resistors 73, 75 and the voltage drop across zener diode 63.

Upon actuation of switch S1 of FIG. 2B, drive conductor 49 drops to a low voltage, as described with respect to FIG. 2, causing flash initiation circuitry 15 to initiate actuation of flash tube 13 driving lines 45, 49 negative with respect to ground. The charge on capacitor 67, however, reverse biases the gate to source junction of FET 69 turning the FET off. The discharge time of capacitor 67 is long with respect to the flash duration of tube 13 for maintaining the FET off during the entire flash of tube 13. The turning off of FET 65 causes transistor 47 to be off, and thus, the internal sensor 17 is effectively disconnected from flash circuitry 11.

Power is provided to external sensor 37 for driving the same via terminals 27, 29 by operation of transistor 87 shorting blocking diode 61. A current path is provided through zener diode 63 (forward biased), the emitter-collector of transistor 87, terminal 27, external sensor 37, zener diode 43 (forward biased) and terminal 29. Diode 41 serves to block current through the camera switch from shorting external sensor circuitry 37. Transistor 87 is turned ON responsive to a lack of drain current when FET 65 is turned OFF. When FET 65 is turned ON, transistor 87 is turned OFF placing blocking diode 61 into the circuitry for use with the circuitry of FIG. 2A as described above.

It should be understood, of course, that the foregoing disclosure relates to a preferred embodiment of the invention and that modifications or alterations may be made therein without departing from the spirit or scope of the invention as set forth in the appended claims.

What is claimed is:

1. Flash control circuitry for use with a photographic camera, comprising:
   terminal means for receiving an electrical control signal;
   flash means for producing a photographic flash; and
   circuit means interconnecting said terminal means and said flash means for initiating the flash of said flash means for producing light for illuminating an object to be photographed by the camera, and for automatically terminating the flash after a predetermined quantity of light has been received from the object, said circuit means including:
   (i) means responsive to an electrical control signal received by said terminal means for firing said flash means;
   (ii) light responsive integrating means arranged to receive light from the object for effecting automatic termination of the flash of said flash means, said integrating means having a first state in which said integrating means is enabled for controlling flash termination and a second state in which said integrating means is disabled from controlling flash termination;
   (iii) control means responsive to an electrical control signal received by said terminal means, for placing said integrating means in one of said first and second states;
   said second-named control signal and said third-named control signal being different voltage signals.

2. Flash control circuitry for use with a photographic camera, including:
   terminal means for receiving an electrical control signal;
   flash means for producing a photographic flash; and
   circuit means interconnecting said terminal means and said flash means for initiating the flash of said flash means for producing light for illuminating an object to be photographed by the camera, and for automatically terminating the flash after a predetermined quantity of light has been received from the object, said circuit means including:
   (i) means responsive to an electrical control signal received by said terminal means for firing said flash means;
   (ii) light responsive integrating means arranged to receive light from the object for effecting automatic termination of the flash of said flash means, said integrating means having a first state in which said integrating means is enabled for controlling flash termination and a second state in which said integrating means is disabled from controlling flash termination; and
   (iii) control means responsive to an electrical control signal received by said terminal means, for placing said integrating means in one of said first and second states;
   said terminal means including a sole pair of terminals for receiving the control signal; and wherein the electrical shorting of said pair of terminals fires said flash means; and wherein the unidirectional flow of current between said terminals places said integrating means in said second state.

3. Flash control circuitry for use with a photographic camera, comprising:
   terminal means for receiving an electrical control signal;
   flash means for producing a photographic flash; and
   circuit means interconnecting said terminal means and said flash means for initiating the flash of said flash means for producing light for illuminating an object to be photographed by the camera, and for automatically terminating the flash after a predetermined quantity of light has been received from the object, said circuit means including:
   (i) means responsive to an electrical control signal received by said terminal means for firing said flash means;
   (ii) light responsive integrating means arranged to receive light from the object for effecting automatic termination of the flash of said flash means, said integrating means having a first state in which said integrating means is enabled for controlling flash termination and a second state in which said integrating means is disabled from controlling flash termination; and
   (iii) control means responsive to an electrical control signal received by said terminal means, for placing said integrating means in one of said first and second states;
   external sensor circuitry means having another light responsive integrating means, said external sensor circuitry means connectable to said terminal means for developing a control signal at said terminal means placing said integrating means in said second state.

4. Flash circuitry according to claim 3 wherein said first-named integrating means produces pulse signal outputs representative of a magnitude of received light energy; and wherein said second named integrating means produces pulse signal outputs representative of a magnitude of received light energy; and wherein said circuit means includes flash termination means responsive to either of said first named or said second named pulse signal outputs for terminating the flash of said flash means.

5. Flash circuitry according to claim 4 wherein pulse signals from one of said two-named pulse signal outputs are received by said flash termination means responsive to the firing of said flash means.

6. Flash circuitry according to claim 4 wherein said flash termination-means includes a conductor electrically connected to said terminal means, for receiving pulse signals from either of said two-named pulse signal outputs; and pulse counting means for counting said pulse signals appearing on said conductor.

7. A flash device for use with a camera comprising:
flash means for generating a photographic flash;
a pair of terminals;
a control conductor connected to one of said terminals;
first light digitizing circuit means for producing a short duration pulse along said conductor, representative of a magnitude of electrical energy monitored by said first light digitizing circuit;
pulse monitoring means connected to said one conductor for sensing said pulse, said monitoring means producing an output indicative of a sensing of said pulse;
counter means for counting according to said output and producing a count output;
means for terminating the flash of said flash means responsive to said count output representing a predetermined magnitude of electrical energy;
second light digitizing circuit means for producing a short duration pulse representative of a magnitude of electrical energy monitored by said second light digitizing circuit means, said second light digitizing circuit means manually connectable to said pair of terminals for producing said pulse along said conductor; and
control means responsive to connection of said second light digitizing circuit means to said pair of terminals, for preventing said first light digitizing circuit from producing a said pulse on said conductor, whereby said pulse monitoring means senses pulses produced solely by said second light digitizing circuit means.

8. A flash device according to claim 7 and further including flash initiation means responsive to a control signal developed on said conductor for initiating the flash of said flash means.

9. A flash device according to claim 7 wherein said second light digitizing circuit includes a connector for electrical communication with the shutter contacts of the camera, said light digitizing circuit means developing said control signal on said conductor responsive to the actuation of the shutter contacts.

10. A flash device according to claim 7 wherein said second light digitizing circuit means is powered via said pair of terminals.

11. A flash device for use with a camera comprising:
flash means for generating a photographic flash;
terminal means having a two-wire connector for connection with a two-wire cable;
first light-digitizing circuit means for producing a short duration pulse representative of a magnitude of radiant energy monitored by said first light digitizing circuit means;
circuit means for sensing a said pulse and counting according thereto for producing a count-output;
terminating means for terminating the flash of said flash means responsive to said count output representing a predetermined magnitude of radiant energy;
remotely positionable external sensor means comprising a two-wire cable manually connectable to said terminal means, said external sensor means, including second light-digitizing circuit means for producing a short duration pulse representative of a magnitude of electrical energy monitored by said second light digitizing circuit; and
control means responsive to connection of said two-wire cable with said terminal means for extinguishing counting by said circuit means of pulses produced by said first light digitizing circuit means and enabling counting by said counting means of pulses produced by said second light digitizing circuit means.

12. A flash device according to claim 11 wherein said external sensor means includes a two-wire connector for providing electrical communication with the camera for receiving an indication of the actuation of the camera shutter.

13. A flash device according to claim 11 wherein said external sensor circuitry means includes voltage developing means for producing a voltage level across said two-wire cable responsive to connection of said two-wire cable with said terminal means; and wherein said control means is responsive to said voltage level.

* * * * *